US007271975B2

(12) United States Patent
Shimizu et al.

(10) Patent No.: US 7,271,975 B2
(45) Date of Patent: Sep. 18, 2007

(54) CONTROLLING HEAD FLYING HEIGHT IN A DATA STORAGE DEVICE

(75) Inventors: Yuki Shimizu, Ibaraki (JP); Hideaki Tanaka, Kanagawa (JP); Mikio Tokuyama, Ibaraki (JP); Junguo Xu, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/217,515

(22) Filed: Aug. 31, 2005

(65) Prior Publication Data

US 2006/0044669 A1   Mar. 2, 2006

(30) Foreign Application Priority Data

Sep. 1, 2004  (JP) ............................. 2004-253944

(51) Int. Cl.
  G11B 21/02   (2006.01)
  G11B 27/36   (2006.01)
  G11B 5/02    (2006.01)
(52) U.S. Cl. ............................. 360/75; 360/25; 360/31
(58) Field of Classification Search ...................... None
  See application file for complete search history.

(56) References Cited

U.S. PATENT DOCUMENTS

| 4,777,544 | A  |   | 10/1988 | Brown et al. |
| 5,909,330 | A  | * | 6/1999  | Carlson et al. ............... 360/31 |
| 6,408,677 | B1 | * | 6/2002  | Suzuki ....................... 73/1.89 |
| 6,587,301 | B1 | * | 7/2003  | Smith .......................... 360/75 |
| 6,678,102 | B1 | * | 1/2004  | Liikanen et al. .............. 360/31 |
| 6,785,079 | B2 | * | 8/2004  | Brannon et al. .............. 360/75 |
| 6,987,628 | B1 | * | 1/2006  | Moline et al. ................ 360/31 |

* cited by examiner

Primary Examiner—K. Wong
(74) Attorney, Agent, or Firm—Townsend and Townsend and Crew LLP; Duke Amaniampong

(57) ABSTRACT

Embodiments of the invention enable the flying of a slider to be lowered and increase recording density with a simple configuration in a magnetic disk apparatus. In one embodiment, a magnetic disk apparatus comprises a magnetic disk including tracks for recording data; a magnetic head slider disposed with a magnetic head that flies over the rotating magnetic disk and records data to, or plays back data from, the magnetic disk; and a control device that controls the operation of the apparatus. Slider flying height data that vary inside the tracks are prerecorded in the tracks of the magnetic disk. The control device controls the operation of the magnetic head slider with respect to the magnetic disk on the basis of the slider flying height data recorded in the tracks.

16 Claims, 6 Drawing Sheets

CONTROLLING HEAD FLYING HEIGHT IN A DATA STORAGE DEVICE

CROSS-REFERENCES TO RELATED APPLICATIONS

This application claims priority from Japanese Patent Application No. JP2004-253944, filed Sep. 1, 2004, the entire disclosure of which is incorporated herein by reference.

BACKGROUND OF THE INVENTION

The present invention relates to a magnetic disk apparatus and a control method thereof, and is particularly suitable for a magnetic disk apparatus disposed with a magnetic head slider that operates by flying over a rotating magnetic disk and a control method thereof.

With respect to magnetic disk apparatus, methods have been proposed in recent years which measure the flying height of a slider using a playback signal from a magnetic head slider or information obtained at the time of signal playback by a magnetic head. For example, in the method of measuring the flying height of a slider disclosed in U.S. Pat. No. 4,777,544 (Patent Document 1), data for measuring the flying height of a slider are recorded in a data area of a magnetic disk and a readback signal is used to measure the flying height of the slider. This method has the advantage that the flying height of the slider can be measured even after the magnetic disk apparatus has been assembled.

BRIEF SUMMARY OF THE INVENTION

In recent years, in accompaniment with improvements in the recording density of magnetic disk apparatus, magnetic head sliders disposed with a magnetic head are being configured to fly increasingly lower. At present, the margin pertaining to the clearance between the magnetic head slider and the magnetic disk has virtually disappeared.

If variations in the flying height of the slider resulting from deformation of the magnetic disk or the like can be controlled, then there is the potential to further lower the flying of the slider. Technology that senses the flying height is indispensable for controlling the flying of the slider, and technology for measuring the flying height of the slider using a readback signal carries promise as technology that can measure the flying height of the slider at the time of operation of the magnetic disk apparatus.

However, when the method of Patent Document 1 is used to sense the flying height of the slider and the sensing result is used to try to control the flying of the slider, there is the potential for variations in the flying of the slider to not be sufficiently controllable due to the time delay or the like of the actuator controlling the flying of the slider, and collision between the magnetic disk and the magnetic head slider cannot be avoided, which results in the reliability of the magnetic disk apparatus being significantly compromised.

It is a feature of the present invention to provide a magnetic disk apparatus and a control method thereof that enable the flying of a slider to be lowered and which increase recording density with a simple configuration or method.

It is another feature of the present invention to provide a magnetic disk apparatus and a control method thereof that enable the flying of a slider to be lowered and which can increase recording density and improve reliability with a simple configuration.

It is yet another feature of the present invention to provide a magnetic disk apparatus and a control method thereof that enable the flying of a slider to be lowered and which can increase recording density and are capable of high-quality recording/playback with a simple configuration. It will be noted that, in the present invention, recording/playback means recording to a magnetic disk or playing back from a magnetic disk.

In accordance with an aspect of the present invention, a magnetic disk apparatus comprises a magnetic disk including tracks for recording data; a magnetic head slider disposed with a magnetic head that flies over the rotating magnetic disk and records data to, or plays back data from, the magnetic disk; and a control device that controls the operation of the apparatus, wherein slider flying height data that vary inside the tracks are prerecorded in the tracks of the magnetic disk, and the control device controls the operation of the magnetic head slider with respect to the magnetic disk on the basis of the slider flying height data recorded in the tracks.

A more preferable, specific configural example of the invention is as follows. Plural annular tracks including plural sectors comprising servo areas for recording servo data and user areas for recording user data are concentrically formed in the magnetic disk, the slider flying height data of each sector of the magnetic disk are recorded in a sector preceding that sector, and the control device controls the operation of the magnetic head slider on the basis of the slider flying height data recorded in the preceding sector.

In accordance with another aspect of the present invention, a magnetic disk apparatus comprises a magnetic disk in which plural annular tracks including plural sectors comprising servo areas for recording servo data and user areas for recording user data are concentrically formed; a magnetic head slider disposed with a magnetic head that flies over the rotating magnetic disk and records data to, or plays back data from, the magnetic disk; and a control device that controls the operation of the apparatus, wherein slider flying height data that vary inside the same track are prerecorded in the tracks of the magnetic disk, and the control device controls on the basis of the slider flying height data recorded in the tracks so as to prevent collision of the magnetic head slider with respect to the magnetic disk.

A more preferable, specific configural example of the invention is as follows. The slider flying height data of each sector inside each track of the magnetic disk are recorded in a sector preceding that sector, and the control device controls on the basis of the slider flying height data recorded in the preceding sector so that the magnetic head slider moves to another track before it collides with the magnetic disk at that sector.

In accordance with another aspect of the present invention, a magnetic disk apparatus comprises a magnetic disk in which plural annular tracks including plural sectors comprising servo areas for recording servo data and user areas for recording user data are concentrically formed; a magnetic head slider disposed with a magnetic head that flies over the rotating magnetic disk and records data to, or plays back data from, the magnetic disk; and a control device that controls the operation of the apparatus, wherein slider flying height data that vary inside the same track are prerecorded in the tracks of the magnetic disk, and the control device controls on the basis of the slider flying height data recorded in the tracks so that the flying height of the magnetic head slider with respect to the magnetic disk becomes substantially constant.

A more preferable, specific configural example of the invention is as follows.

(1) The slider flying height data of each sector inside each track of the magnetic disk are recorded in a sector preceding that sector, and the control device controls on the basis of the slider flying height data recorded in each sector so that the flying height of that sector becomes substantially the same as that of the other sectors.

(2) The magnetic disk apparatus further comprises an actuator that adjusts the flying height of the magnetic head slider, wherein the slider flying height data of each sector inside each track are recorded in a sector preceding by at least an operational time constant of the actuator, and the control device controls the actuator on the basis of the slider flying height data recorded in the preceding sector.

(3) The magnetic disk apparatus further comprises an outside environmental change detecting module that detects atmospheric pressure and outside temperature changes, wherein the control device controls on the basis of the slider flying height data recorded in the tracks and the data detected by the outside environmental change detecting module.

Another aspect of the present invention is directed to a method of controlling a magnetic disk apparatus disposed with a magnetic disk including tracks for recording data and a magnetic head slider disposed with a magnetic head that flies over the rotating magnetic disk and records data to, or plays back data from, the magnetic disk. The method comprises using the magnetic disk, the magnetic head and the magnetic head slider to measure the flying height of the magnetic head slider varying inside the tracks of the magnetic disk; using the magnetic head and the magnetic head slider to record, on the tracks of the magnetic head, the measured slider flying height data; and controlling the operation of the magnetic head slider with respect to the magnetic disk on the basis of the slider flying height data recorded in the tracks.

Another aspect of the present invention is directed to a method of controlling a magnetic disk apparatus disposed with a magnetic disk in which plural annular tracks including plural sectors comprising servo areas for recording servo data and user areas for recording user data are concentrically formed and a magnetic head slider disposed with a magnetic head that flies over the rotating magnetic disk and records data to, or plays back data from, the magnetic disk. The method comprises using the magnetic disk, the magnetic head and the magnetic head slider to measure the slider flying height varying in each sector inside each track of the magnetic disk; using the magnetic head and the magnetic head slider to record, in a sector preceding the sector of each track of the magnetic head, the measured slider flying height data; and controlling on the basis of the slider flying height data recorded in each sector so as to prevent collision of the magnetic head slider with respect to the magnetic disk.

Another aspect of the present invention is directed to a method of controlling a magnetic disk apparatus disposed with a magnetic disk in which plural annular tracks including plural sectors comprising servo areas for recording servo data and user areas for recording user data are concentrically formed and a magnetic head slider disposed with a magnetic head that flies over the rotating magnetic disk and records data to, or plays back data from, the magnetic disk. The method comprises using the magnetic disk, the magnetic head and the magnetic head slider to measure the slider flying height varying in each sector in each track of the magnetic disk; using the magnetic head and the magnetic head slider to record, in a sector preceding the sector of each track of the magnetic head, the measured slider flying height data; and controlling on the basis of the slider flying height data recorded in each sector so that the flying height of the magnetic head slider with respect to the magnetic disk becomes substantially constant.

According to the present invention, a magnetic disk apparatus and a control method thereof can be provided which enable the flying of a slider to be lowered and which increase recording density with a simple configuration or method.

Also according to the present invention, a magnetic disk apparatus and a control method thereof can be provided which enable the flying of a slider to be lowered and which can increase recording density and improve reliability with a simple configuration.

Also according to the present invention, a magnetic disk apparatus and a control method thereof can be provided which enable the flying of a slider to be lowered and which can increase recording density and are capable of high-quality recording/playback with a simple configuration.

DETAILED DESCRIPTION OF THE INVENTION

Figure 1:
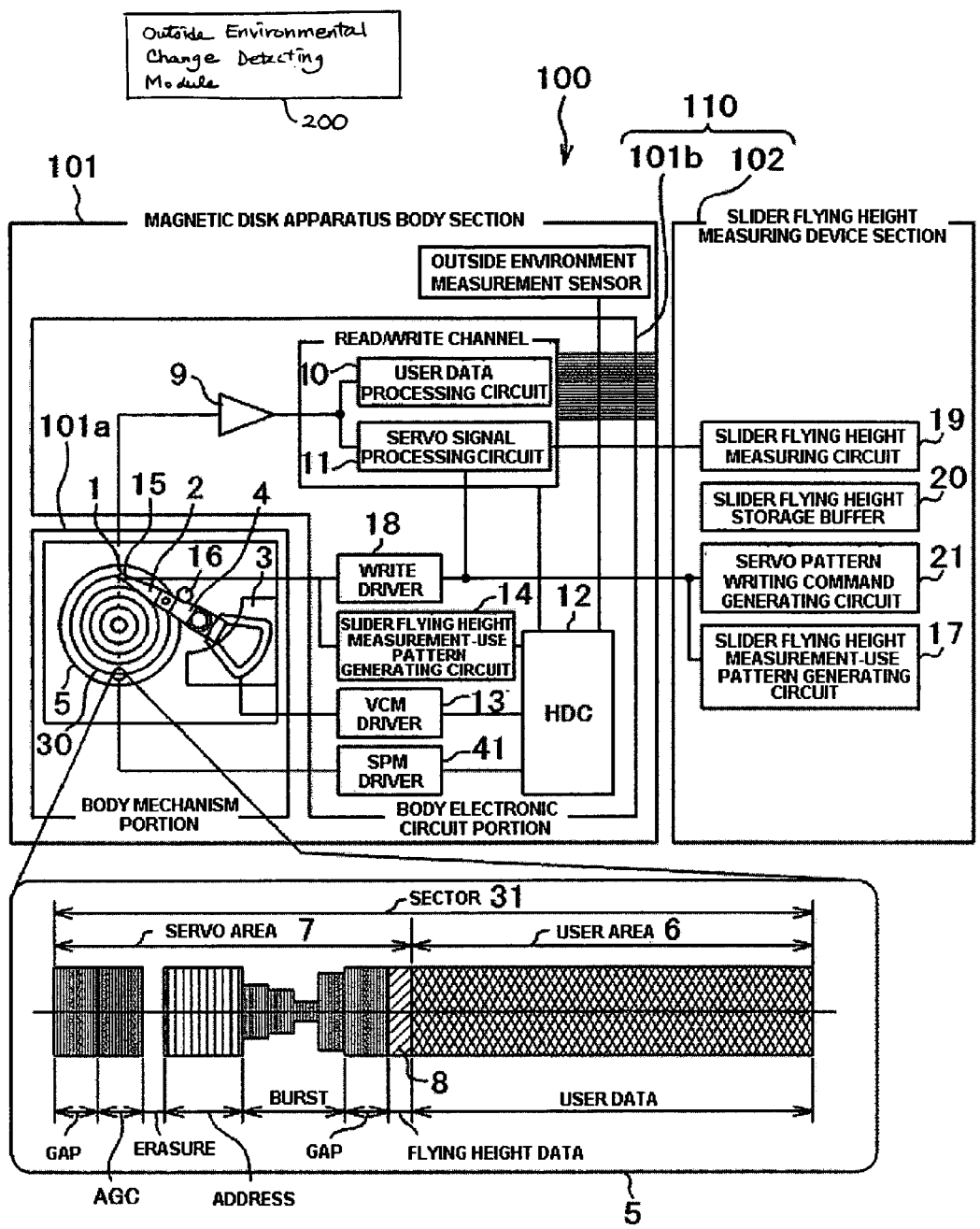
FIG. 1 is a configural diagram of a magnetic disk apparatus pertaining to an embodiment of the invention.

A magnetic disk apparatus and a control method thereof pertaining to an embodiment of the invention will be described below using FIGS. 1 to 6. First, the entire magnetic disk apparatus of the present embodiment will be described with reference to FIG. 1. FIG. 1 is a configural diagram of a magnetic disk apparatus 100 pertaining to the embodiment of the invention.

The magnetic disk apparatus 100 includes a magnetic disk apparatus body section 101 and a slider flying height measuring device section 102. The magnetic disk apparatus 100 also includes a magnetic disk 5 disposed with tracks 30 including servo areas 7 for recording servo data and user areas 6 for recording user data, a magnetic head slider 1 disposed with a magnetic head (not shown) that flies over the rotating magnetic disk 5 and records data to the magnetic disk 5 or plays back data recorded on the magnetic disk 5, and a control device 110 that controls the operation of the apparatus.

The magnetic disk apparatus body section 101 is configured by a body mechanism section or portion 101a and a body electronic circuit section or portion 101b. The control device 110 is configured by the body electronic circuit section 101b and the slider flying height measuring device section 102. It should be noted that, although the slider flying height measuring device section 102 is configured independently from the magnetic disk apparatus body section 101 in the present embodiment, it may also be housed in the body electronic circuit section 101b of the magnetic disk apparatus body section 101.

The body mechanism portion 101a includes the magnetic head slider 1, a suspension 2, a VCM (Voice Coil Motor) coil 3, an arm 4, the magnetic disk 5, a flying height control actuator 15, and a magnetic head positioning mechanism 16.

The magnetic head slider 1, which includes the magnetic head for recording/playing back information, is attached to the suspension 2. The suspension 2 is attached to the carriage arm 4 disposed with the VCM coil 3 to configure an HSA (Head Stack Assembly). Pressure resulting from the flow of air between the rotating magnetic disk 5 and the magnetic head slider 1 and a pushing force resulting from the suspension 2 work together to cause the magnetic head slider 1 to fly over the magnetic disk 5, and the magnetic head slider 1 records/plays back data in this state. The magnetic head slider 1 operates in a state where it has been moved in the radial direction of the magnetic disk 5, and flown and positioned at a predetermined track 30.

The magnetic disk 5 comprises one or plural disks and is rotated at a high speed in one direction by a spindle motor. The annular tracks 30 are formed in the magnetic disk 5 and include plural sectors 31 comprising the user areas 6 for recording user data and the servo areas 7 in which are recorded servo data used to position the magnetic head. The plural annular tracks 30 are concentrically formed in the magnetic disk 5. Respective portions of a gap, an AGC pattern, an erasure, an address, a burst signal, and a gap, for example, are disposed in this order in the rotational direction in the servo area 7. Here, a slider flying height recording area 8, in which a magnetic head slider flying height measurement value is recorded, is included in the servo area 7. The slider flying height measurement value may be recorded at an optional position in the servo area 7, but it may also be embedded in the AGC pattern portion or embedded in the burst signal portion, for example.

The body electronic circuit portion 101b includes a preamp 9, a user data processing circuit 10, a servo signal processing circuit 11, an HDC (Hard Disk Controller) 12, a VCM driver 13, an actuator driver 14 for adjusting the flying height, a write driver 18, and a spindle motor driver 41. The body electronic circuit portion 101b controls the driving of the body mechanism section 101a.

Signals played back by the magnetic head slider 1 are amplified by the preamp 9. With respect to these amplified playback signals, signals from the user areas 6 are processed by the user data processing circuit 10, and signals from the servo areas 7 are processed by the servo signal processing circuit 11. The output information of the servo data processing circuit 11 is sent to the HDC 12, and the HDC 12 controls the size of the current inputted to the VCM driver 13 on the basis of this output information to position the magnetic head slider 1.

Information regarding the flying height of the magnetic head slider 1 included in the servo areas 7 is processed with the servo data by the servo signal processing circuit 11, or processed by a slider flying height information processing circuit (not shown) disposed separately from the servo signal processing circuit 11, and this flying height information is inputted to the actuator driver 14 for adjusting the flying height of the slider. On the basis of this input information, the actuator driver 14 drives the flying height control actuator 15 to control the flying height of the magnetic head slider 1. Because the information relating to the flying height of the magnetic head slider 1 is itself prerecorded in the servo areas 7, it is not necessary to dispose, in the magnetic disk apparatus, a signal processing circuit for processing the magnetic head playback signals to determine the flying height of the magnetic head slider 1, and increases in the cost and complexity of the apparatus can be suppressed. Also, because the flying height of the magnetic head slider 1 is recorded in the servo areas 7, a loss in the recording capacity of the magnetic disk apparatus resulting from recording the flying height information can be suppressed.

The slider flying height measuring device section 102 includes a pattern generating circuit 17 for measuring the flying height of the slider, a slider flying height measuring circuit 19, a slider flying height storage buffer 20 and a servo pattern writing command generating circuit 21.

Figure 2:
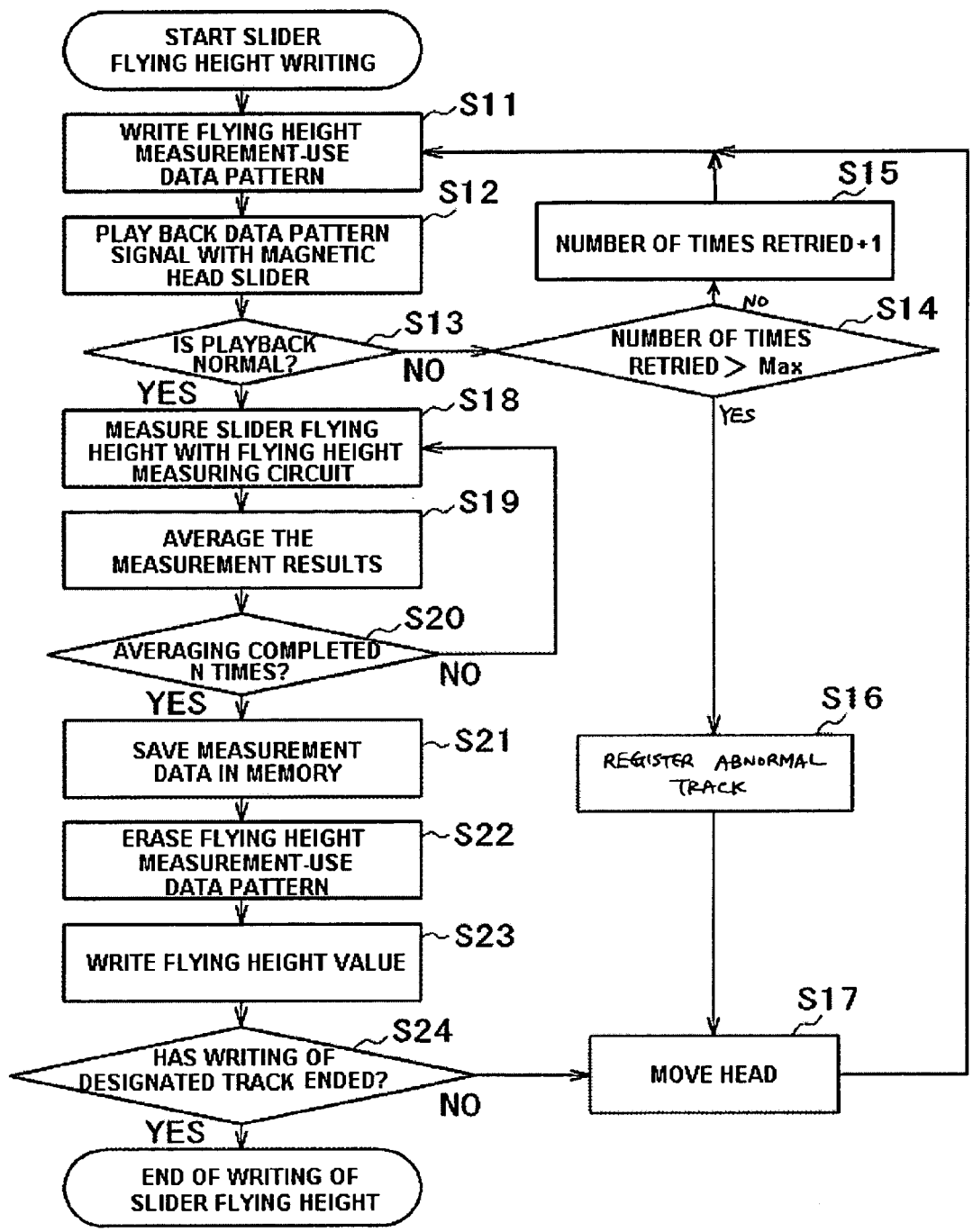
FIG. 2 is a flow chart showing the writing of slider flying height data by the magnetic disk apparatus of the embodiment.

Next, the operation of measuring/writing the magnetic head slider flying height to the magnetic disk apparatus 100 will be described using FIGS. 1 and 2. FIG. 2 is a flow chart showing the writing of the slider flying height data by the magnetic disk apparatus 100 of FIG. 1.

The output from the slider flying height measurement-use pattern generating circuit 17 is inputted to the write driver 18, and a pattern for measuring the flying height for one circuit of the tracks 30 of the magnetic disk 5 is recorded by a magnetic recording head of the magnetic head slider 1 (step S11). This recorded flying height measurement-use pattern is played back by a magnetic playback head of the magnetic head slider 1 (step S12). The playback signal is inputted to the slider flying height measuring circuit 19 through the preamp 9 and the servo signal processing circuit 11, the flying height of the magnetic head slider 1 is calculated, and it is determined whether the playback is normal (step S13).

In this determination, when the output level of the playback signal is determined to be equal to or below a specified value and therefore abnormal, the writing of the pattern for measuring the flying height is again executed and re-measurement is done. Namely, it is determined whether the number of rewrites (number of writings) exceeds a predetermined value (Max) (step S14), and 1 is added to the number of rewrites (step S15). Then, the process returns to step S11 and the processing of steps S11 to S13 is conducted. When the number of rewrites exceeds the predetermined number in S14, it is determined that that track is abnormal, the abnormal track is registered (step S16), and the magnetic head slider 1 is moved to the next track (step S17). Thereafter, the process returns to step S11.

In the determination of step 13, when it has been determined that the output level of the playback signal exceeds the specified value and therefore normal, the measurement of the flying height of the slider is repeated a predetermined number of times (N times). Namely, the flying height of the slider is measured by the slider flying height measuring circuit 19 on the basis of the signal from the magnetic head (step S18), and the result of this measurement and the result of the previous measurement are averaged (step S19). Thereafter, it is determined whether averaging has been conducted the predetermined number of times (step S20). When averaging has not been conducted the predetermined number of times, the process returns to step S18 and the processing is repeated until the number of times reaches the predetermined number of times. In this manner, by conducting measurement the predetermined number of times and averaging the results to obtain the measurement result, highly precise control can be done.

In the determination of step S20, when averaging of the measurement results has been conducted the predetermined number of times, then the measured flying height (averaged flying height) is temporarily stored in the slider flying height storage buffer 20 (step S21). Thereafter, an erase signal is outputted from the write driver 18, and the pattern for measuring the flying height of the slider recorded in the magnetic disk 5 is erased (step S22). Next, the output of the servo pattern writing command generating circuit 21 is inputted to the write driver 18, and the slider flying height stored in the slider flying height storage buffer 20 is recorded in the servo areas 7 of each sector 31 (step S23). At this time, because the slider flying height value is already stored in the storage buffer 20, it is possible to record the slider flying height measurement result at an optional position rather than the actual slider flying height measurement position, and it is possible to adjust the flying height recording position in consideration of the time constant of the actuator 15 that can adjust the slider flying height, for example.

This series of operations is repeated while changing the position of the magnetic head slider 1 over the tracks 30, and the servo data and slider flying height values are written to the entire magnetic disk surface (step S24).

Figure 3:
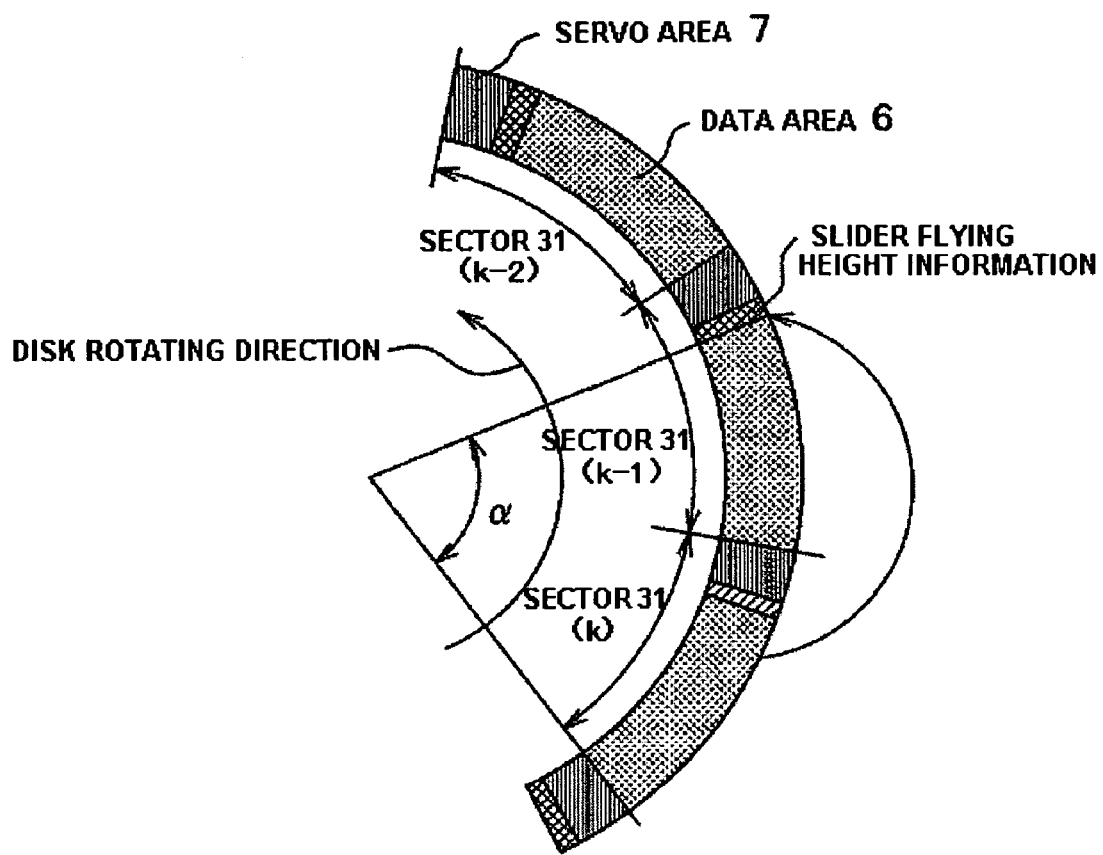
FIG. 3 is a schematic diagram describing the relationship between recording positions and measurement positions of flying heights in tracks of the embodiment.

Next, the relationship between the positions at which the slider flying height is measured and the positions of the flying height measurement value written to the magnetic disk 5 will be described with reference to FIG. 3. FIG. 3 is a partial schematic diagram of one track of the present embodiment.

The flying height of the slider is measured in each sector 31 of the track 30. In the present embodiment, the flying height of the slider is measured in the data area 6 of each sector 31. The flying height value measured in sector 31($k$) is recorded in the servo area 7 of the preceding (in other words, preceding in the rotational direction) sector 31, e.g., sector 31($k$-1), so that the flying height value is read prior to the reading of the data of sector 31($k$). Also, the flying height value measured in sector 31($k$-1) is recorded in the servo area 7 of the preceding sector 31($k$-2) so that the flying height value is read prior to the reading of the data of sector 31($k$-1).

Here, when the magnetic disk apparatus 100 is disposed with an actuator 15 such as a piezoelectric actuator that can adjust the flying height of the magnetic head slider 1, when the writing position of the slider flying height is determined in consideration of the time constant of the actuator 15, it becomes possible to control the flying height of the slider using the capability of the actuator 15 to the limit. Given that R represents the position of the magnetic head from the rotational center of the magnetic disk, V represents the rotational speed of the disc at that position, and T represents the time constant of the actuator, it is preferable for the preceding angle a to satisfy the following expression (1).

$$\alpha > = V \cdot T/R \quad (1)$$

The angle a may be made large, and the flying height of the slider read from the servo area 7 may be temporarily stored in the buffer and read from the buffer in accordance with the time constant of the actuator 15. Here, a piezoelectric actuator was given as an example, but the actuator may be any kind of actuator.

Also, even when the magnetic disk apparatus does not have this kind of actuator, if the angle a is determined in consideration of the time constant of the magnetic head positioning mechanism 16, e.g., when a change is detected in the outside environment causing a deterioration in the flying of the magnetic head slider 1, the risk of contact between the disk and the magnetic head slider can be calculated from the flying height deterioration value resulting from the outside environment change and the flying height value recorded in the servo areas 7 before actually accessing the portion where the flying height is low. As a result, control can be done so that contact between the magnetic head slider 1 and the magnetic disk 5 is avoided beforehand, and the reliability of the magnetic disk apparatus 100 can be improved. In this case also, it is preferable for the angle a to be set to satisfy the expression (1). However, the magnetic disk apparatus must be disposed with a module 200 (FIG. 1) to detect changes in the outside environment such as an atmospheric sensor or a thermal sensor, or such information must be obtained from the outside.

Examples of the operation of the magnetic disk apparatus 100 of the present embodiment will be described using the flow charts of FIGS. 4 to 6.

Figure 4:
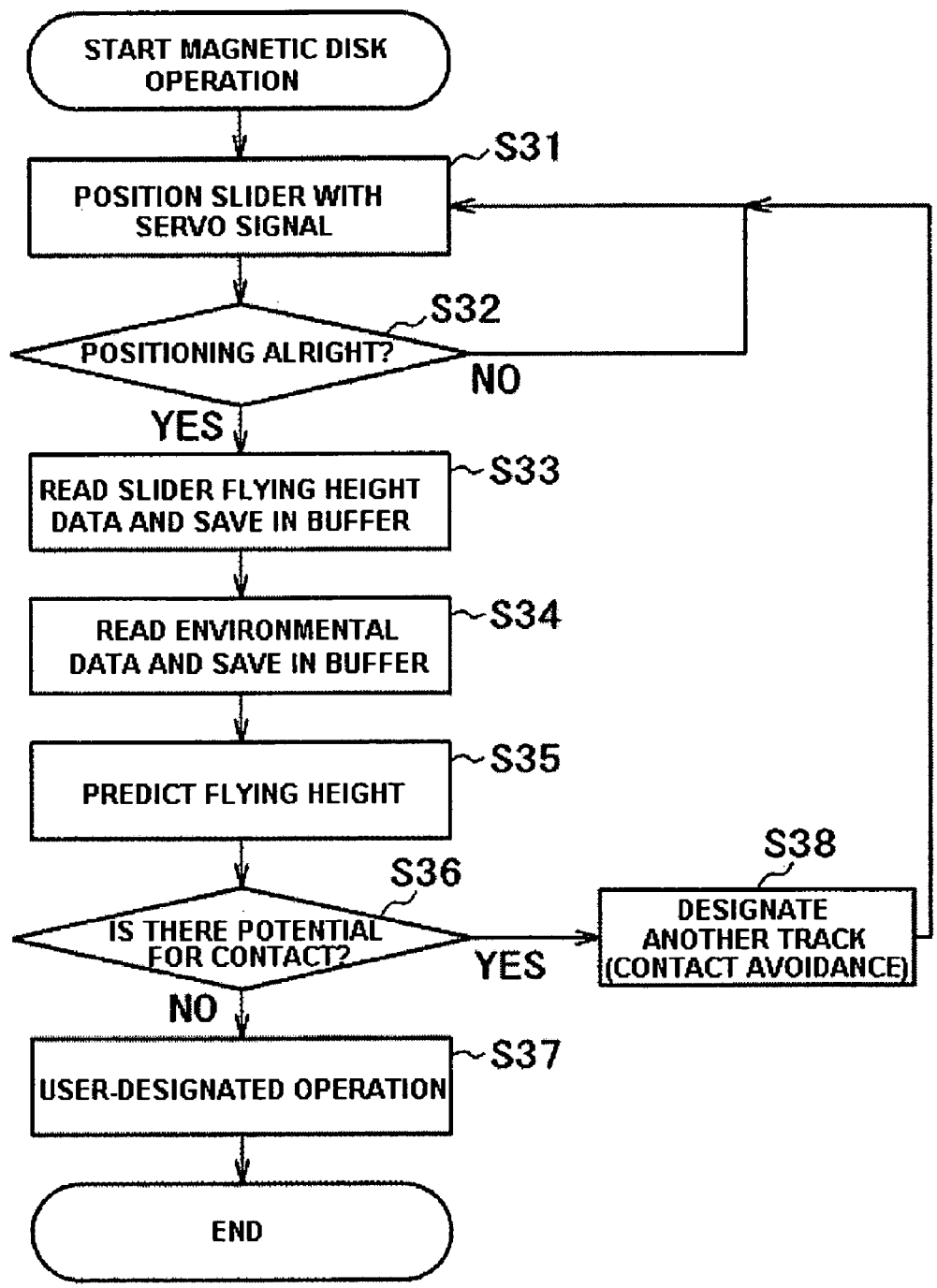
FIG. 4 is an operational flow chart in a case where contact between a magnetic head slider and a magnetic disk is avoided without using a flying height control actuator in the magnetic disk apparatus of the embodiment.
Figure 5:
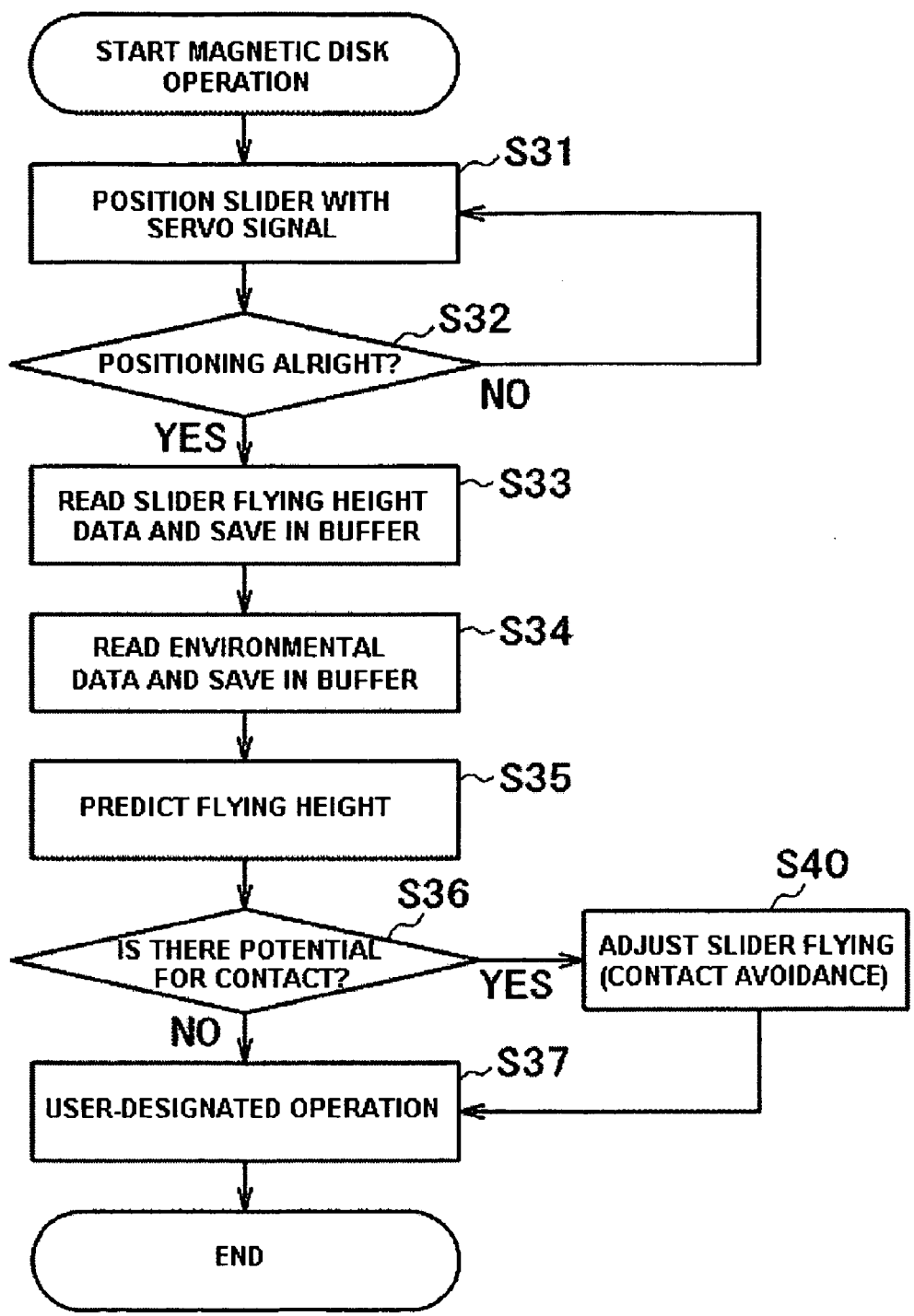
FIG. 5 is an operational flow chart in a case where contact between the magnetic head slider and the magnetic disk is avoided using the flying height control actuator in the magnetic disk apparatus of the embodiment.

FIG. 4 is an operational flow chart in a case where adjustment of the flying height by the flying height control actuator 15 is not conducted. Because the magnetic disk apparatus 100 does a designated operation, it positions the magnetic head slider 1 using a servo signal (steps S31 and S32). When this positioning is done, the slider flying height value recorded in the servo area 7 is read, and this value is saved in the buffer (step S33). Next, environmental data such as the atmospheric pressure, the outside temperature and the outside humidity are read, and amounts of variations in the slider flying resulting from those affects are calculated and saved in the buffer (step S34). Thereafter, the flying height of the slider is predicted using the information saved in the buffer (step S35). On the basis of the result of this calculation, it is determined whether there is the potential for the magnetic head slider 1 and the magnetic disk 5 to come into contact (step S36). When it is determined that there is the potential for the magnetic head slider 1 and the magnetic disk 5 to come into contact, then the magnetic head slider 1 is moved to another track to avoid contact (step S38). When it is determined that there is no potential for the magnetic head slider 1 and the magnetic disk 5 to come into contact and that it is safe, an operation designated by the user is executed (step S37). It should be noted that the operational flow chart of FIG. 4 is also applicable to a magnetic disk apparatus not using the flying height control actuator 15.

Figure 6:
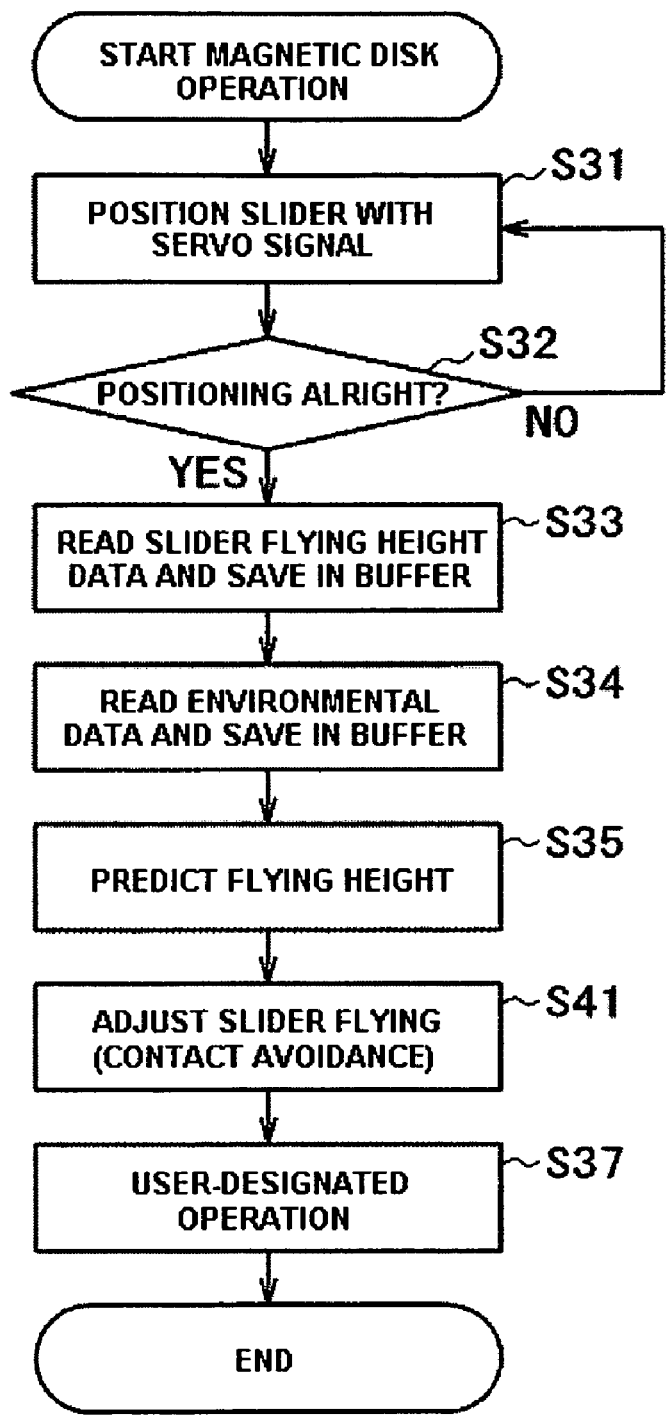
FIG. 6 is an operational flow chart in a case where contact between the magnetic head slider and the magnetic disk is avoided using the flying height control actuator in the magnetic disk apparatus of the embodiment.

FIG. 6 is an operational flow chart where variations in the slider flying are suppressed by actively utilizing the flying height control actuator 15. In the operational flow chart of FIG. 6, the operations of steps S31 to S35 and S37 are the same as in the operational flow chart of FIG. 4, but the user-designated operation is executed while continually adjusting the flying height using the flying height control actuator 15 so that the slider flying height becomes a substantially constant value, regardless of the potential for the magnetic head slider 1 and the magnetic disk 5 to come into contact. Thus, amounts of variation in slider flying can be reduced, and the slider flying height value can be set low at the time the magnetic disk apparatus is designed. As a result, higher quality recording/playback becomes possible.

According to the magnetic disk apparatus 100 described above, the magnetic disk apparatus comprises: a magnetic disk 5 including tracks 30 for recording data; a magnetic head slider 1 disposed with a magnetic head that flies over the rotating magnetic disk 5 and records data to, or plays back data from, the magnetic disk 5; and a control device 110 that controls the operation of the apparatus, wherein slider flying height data that vary inside the tracks 30 are prerecorded in the tracks 30 of the magnetic disk 5, and the control device 110 controls the operation of the magnetic head slider 1 with respect to the magnetic disk 5 on the basis of the slider flying height data recorded in the tracks 30. Thus, a magnetic disk apparatus can be provided which enables the flying of a slider to be lowered and which increases recording density with a simple configuration.

Additionally, the slider flying height data of each sector 31 included in each track 30 of the magnetic disk 5 are recorded in a sector 31 preceding that sector 31, and the control device 110 controls the operation of the magnetic head slider 1 on the basis of the slider flying height data recorded in the preceding sector 31. Thus, a magnetic disk apparatus can be provided which more reliably enables the flying of a slider to be lowered and which increases recording density.

Also, according to the magnetic disk 5 apparatus 100 of the present embodiment, the magnetic disk apparatus comprises: a magnetic disk 5 in which plural annular tracks 30 including plural sectors 31 comprising servo areas 7 for recording servo data and user areas 6 for recording user data are concentrically formed; a magnetic head slider 1 disposed with a magnetic head that flies over the rotating magnetic disk 5 and records data to, or plays back data from, the magnetic disk 5; and a control device 110 that controls the operation of the apparatus, wherein slider flying height data that vary inside the same track 30 are prerecorded in the tracks 30 of the magnetic disk 5, and the control device 110 controls on the basis of the slider flying height data recorded in the tracks 30 so as to prevent collision of the magnetic head slider 1 with respect to the magnetic disk 5. Thus, a magnetic disk apparatus can be provided which enables the flying of a slider to be lowered, increases recording density and improves reliability with a simple configuration.

Additionally, the slider flying height data of each sector 31 included inside each track 30 of the magnetic disk 5 are recorded in a sector 31 preceding that sector 31, and the control device 110 controls on the basis of the slider flying height data recorded in the preceding sector 31 so that the magnetic head slider 1 moves to another track 30 before it collides with the magnetic disk 5 at that sector 31. Thus, a magnetic disk apparatus can be provided which more reliably enables the flying of a slider to be lowered, increases recording density and improves reliability.

Further, according to the magnetic disk 5 apparatus 100 of the present embodiment, the magnetic disk apparatus comprises: a magnetic disk 5 in which plural annular tracks 30 including plural sectors 31 comprising servo areas 7 for recording servo data and user areas 6 for recording user data are concentrically formed; a magnetic head slider 1 disposed with a magnetic head that flies over the rotating magnetic disk 5 and records data to, or plays back data from, the magnetic disk 5; and a control device 10 that controls the operation of the apparatus, wherein slider flying height data that vary inside the same track 30 are prerecorded in the tracks 30 of the magnetic disk 5, and the control device 110 controls on the basis of the slider flying height data recorded in the tracks 30 so that the flying height of the magnetic head slider 1 with respect to the magnetic disk 5 becomes substantially constant. Thus, a magnetic disk apparatus can be provided which enables the flying of a slider to be lowered, increases recording density and is capable of high-quality recording/playback with a simple configuration.

Additionally, the slider flying height data of each sector 31 included inside each track 30 of the magnetic disk 5 are recorded in a sector 31 preceding that sector 31, and the control device 110 controls on the basis of the slider flying height data recorded in each sector 31 so that the flying height of that sector 31 becomes substantially the same as that of the other sectors 31. Thus, a magnetic disk apparatus can be provided which more reliably enables the flying of a slider to be lowered, increases recording density and is capable of high-quality recording/playback.

Additionally, the slider flying height data of each sector 31 included inside each track 30 of the magnetic disk 5 are recorded in a sector 31 preceding by at least an operational time constant of a slider flying height control actuator 15, and the control device 110 controls the slider flying height control actuator 15 on the basis of the slider flying height data recorded in the preceding sector 31. Thus, in terms of this point also, a magnetic disk apparatus can be provided which more reliably enables the flying of a slider to be lowered, increases recording density and is capable of high-quality recording/playback.

Additionally, the magnetic disk apparatus further comprises an outside environmental change detecting module 200 that detects atmospheric pressure and outside temperature changes, wherein the control device 110 controls on the basis of the slider flying height data recorded in the tracks 30 and the data detected by the outside environmental change detecting module 200. Thus, in terms of this point also, a magnetic disk apparatus can be provided which more reliably enables the flying of a slider to be lowered and increases recording density.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk apparatus comprising:
a magnetic disk in which plural annular tracks including plural sectors, each comprising servo areas for recording servo data and user areas for recording user data, are concentrically formed;
a magnetic head slider disposed with a magnetic head that flies over the rotating magnetic disk and records data to, or plays back data from, the magnetic disk; and
a control device that controls the operation of the apparatus,
wherein slider flying height data that vary inside the same track are recorded in the tracks of the magnetic disk, and
wherein the control device controls the slider flying height on the basis of the slider flying height data recorded in the tracks so as to prevent collision of the magnetic head slider with respect to the magnetic disk, and wherein:
the slider flying height data of each sector inside each track of the magnetic disk are recorded in a sector preceding that sector, and
the control device controls the operation of the apparatus on the basis of the slider flying height data recorded in each sector so that the flying height of that sector becomes substantially the same as the flying height of the other sectors.

2. A magnetic disk apparatus comprising:
a magnetic disk in which plural annular tracks including plural sectors, each comprising servo areas for recording servo data and user areas for recording user data, are concentrically formed;
a magnetic head slider disposed with a magnetic head that flies over the rotating magnetic disk and records data to, or plays back data from, the maanetic disk; and
a control device that controls the operation of the apparatus,
wherein slider flying height data that vary inside the same track are recorded in the tracks of the magnetic disk, and
wherein the control device controls the operation of the apparatus on the basis of the slider flying height data recorded in the tracks so that the flying height of the magnetic head slider with respect to the magnetic disk becomes substantially constant, and wherein:
the slider flying height data of each sector inside each track of the magnetic disk are recorded in a sector preceding that sector, and
the control device controls the operation of the apparatus on the basis of the slider flying height data recorded in each sector so that the flying height of that sector becomes substantially the same as the flying height of the other sectors.

3. The magnetic disk apparatus of claim 2, further comprising an actuator that adjusts the flying height of the magnetic head slider, wherein:
the slider flying height data of each sector inside each track are recorded in a sector preceding by at least an operational time constant of the actuator, and
the control device controls the actuator on the basis of the slider flying height data recorded in the preceding sector.

4. A magnetic disk apparatus comprising:
a magnetic disk including tracks for recording data;
a magnetic head slider disposed with a magnetic head that flies over the rotating magnetic disk and records data to, or plays back data from, the magnetic disk;
a control device that controls the operation of the apparatus, wherein slider flying height data that vary inside the tracks are recorded in the tracks of the magnetic disk, and wherein the control device controls the operation of the magnetic head slider with respect to the magnetic disk on the basis of the slider flying height data recorded in the tracks; and
an outside environmental change detecting module that detects atmospheric pressure and outside temperature changes, wherein the control device controls on the basis of the slider flying height data recorded in the tracks and the data detected by the outside environmental change detecting module.

5. The magnetic disk apparatus of claim 4, wherein:
plural annular tracks including plural sectors comprising servo areas for recording servo data and user areas for recording user data are concentrically formed in the magnetic disk,
the slider flying height data of each sector of the magnetic disk are recorded in a sector preceding that sector, and
the control device controls the operation of the magnetic head slider on the basis of the slider flying height data recorded in the preceding sector.

6. The magnetic disk apparatus of claim 4, wherein the slider flying height data is prerecorded in a servo area of a sector.

7. The magnetic disk apparatus of claim 4, wherein the magnetic disk apparatus does not include a signal processing circuit for processing magnetic head playback signals to determine a flying height of the magnetic head slider.

8. The magnetic disk apparatus of claim 1, further comprising an outside environmental change detecting module that detects environmental data, wherein the control device controls on the basis of the slider flying height data recorded in the tracks and the environmental data detected by the outside environmental change detecting module.

9. The magnetic disk apparatus of claim 8, wherein the environmental data includes at least one of an atmospheric pressure, an outside temperature and an outside humidity.

10. A method of controlling a magnetic disk apparatus disposed with a magnetic disk in which plural annular tracks including plural sectors comprising servo areas for recording servo data and user areas for recording user data are concentrically formed and a magnetic head slider disposed with a magnetic head that flies over the rotating magnetic disk and records data to, or plays back data from, the magnetic disk, the method comprising:
using the magnetic disk, the magnetic head and the magnetic head slider to measure the slider flying height for each sector inside each track of the magnetic disk;
for each sector, using the magnetic head and the magnetic head slider to record, in a sector preceding that sector, the measured slider flying height data for that sector; and
controlling the slider flying height on the basis of the slider flying height data recorded in each sector so as to prevent collision of the magnetic head slider with respect to the magnetic disk.

11. The method of claim 10, wherein data in the user areas is read in order to measure the slider flying height.

12. The method of claim 10, wherein the angle α between the slider flying height data stored in the preceding sector and the user area for that sector, from which the slider flying height data was measured, satisfies $\alpha >= V \cdot T/R$, wherein R represents a position of the magnetic head from a rotational center of the magnetic disk, V represents a rotational speed of the magnetic disk at that position, and T represents a time constant of an actuator of the magnetic disk apparatus.

13. A method of controlling a magnetic disk apparatus disposed with a magnetic disk in which plural annular tracks including plural sectors comprising servo areas for recording servo data and user areas for recording user data are concentrically formed and a magnetic head slider disposed with a magnetic head that flies over the rotating magnetic disk and records data to, or plays back data from, the magnetic disk, the method comprising:
using the magnetic disk, the magnetic head and the magnetic head slider to measure the slider flying height for each sector in each track of the magnetic disk;
for each sector, using the magnetic head and the magnetic head slider to record, in a sector preceding that sector, the measured slider flying height data for that sector; and
controlling the operation of the apparatus on the basis of the slider flying height data recorded in each sector so that the flying height of the magnetic head slider with respect to the magnetic disk becomes substantially constant.

14. A method of controlling a magnetic disk apparatus disposed with a magnetic disk including tracks for recording data and a magnetic head slider disposed with a magnetic head that flies over the rotating magnetic disk and records data to, or plays back data from, the maanetic disk, the method comprising:

using the magnetic disk, the magnetic head and the magnetic head slider to measure the flying height of the magnetic head slider varying inside the tracks of the magnetic disk;

using the magnetic head and the magnetic head slider to record, on the tracks of the magnetic disk, the measured slider flying height data;

controlling the operation of the magnetic head slider with respect to the magnetic disk on the basis of the slider flying height data recorded in the tracks; and detecting environmental data with an outside environmental change detecting module, wherein controlling the operation of the magnetic head slider is based on the slider flying height data recorded in the tracks and the environmental data.

15. The method of claim 14, wherein using the magnetic disk, the magnetic head and the magnetic head slider to measure the flying height of the magnetic head slider includes averaging measurements for a track.

16. The method of claim 14, wherein a slider flying height measuring device that is independent from the magnetic disk apparatus is also used to measure the flying height of the magnetic head slider.

* * * * *

UNITED STATES PATENT AND TRADEMARK OFFICE
CERTIFICATE OF CORRECTION

PATENT NO.         : 7,271,975 B2                                     Page 1 of 1
APPLICATION NO.    : 11/217515
DATED              : September 18, 2007
INVENTOR(S)        : Shimizu et al.

It is certified that error appears in the above-identified patent and that said Letters Patent is hereby corrected as shown below:

In the Claims:
Claim 2, Column 11, Line 8, please delete "maanetic" and insert --magnetic--.

Claim 14, Column 13, Line 5, please delete "maanetic" and insert --magnetic--.

Signed and Sealed this

Sixth Day of May, 2008

JON W. DUDAS
*Director of the United States Patent and Trademark Office*